US012601997B2

(12) United States Patent
Kameyama

(10) Patent No.: US 12,601,997 B2
(45) Date of Patent: Apr. 14, 2026

(54) IMAGE FORMING APPARATUS THAT DETECTS STOPPING POSITION OF ROTOR OF MOTOR

(71) Applicant: CANON KABUSHIKI KAISHA, Tokyo (JP)

(72) Inventor: Shigeru Kameyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/791,853

(22) Filed: Aug. 1, 2024

(65) Prior Publication Data

US 2025/0060695 A1 Feb. 20, 2025

(30) Foreign Application Priority Data

Aug. 14, 2023 (JP) ................................. 2023-132044

(51) Int. Cl.
 *G03G 15/00* (2006.01)
 *H02P 6/185* (2016.01)
(52) U.S. Cl.
 CPC ......... *G03G 15/5008* (2013.01); *G03G 15/80* (2013.01); *H02P 6/185* (2013.01)
(58) Field of Classification Search
 USPC ......................................................... 399/36
 See application file for complete search history.

(56) References Cited

U.S. PATENT DOCUMENTS

2002/0171388 A1* 11/2002 Seki ........................ H02P 6/185
                                                              318/727
2015/0145454 A1  5/2015 Kameyama

FOREIGN PATENT DOCUMENTS

JP      2015104263 A      6/2015

* cited by examiner

*Primary Examiner* — Quana Grainger
(74) *Attorney, Agent, or Firm* — ROSSI, KIMMS & McDOWELL LLP

(57) ABSTRACT

The image forming apparatus includes a motor including at least three coils, first terminals of which are connected to one another; and a motor control unit. The motor control unit detects a stopping position of the motor by executing measuring processing including performing control so that a coil current flows from a first coil to a second coil and measuring a current value. The motor control unit is configured to perform control so that the coil current flows from the first coil toward the second coil in a first period, attenuates the coil current in a second period, and perform control so that a portion of the coil current flows from a second terminal of the second coil, via a second terminal of a third coil, to the third coil in a third period within the second period.

12 Claims, 12 Drawing Sheets

F I G.  1
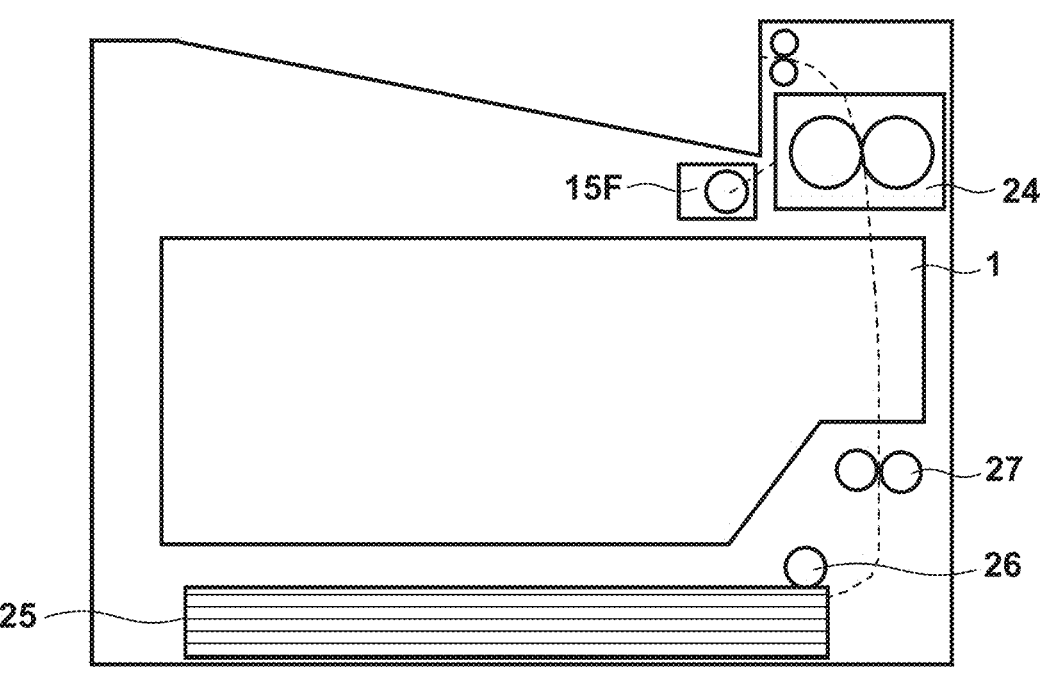
F I G.  2
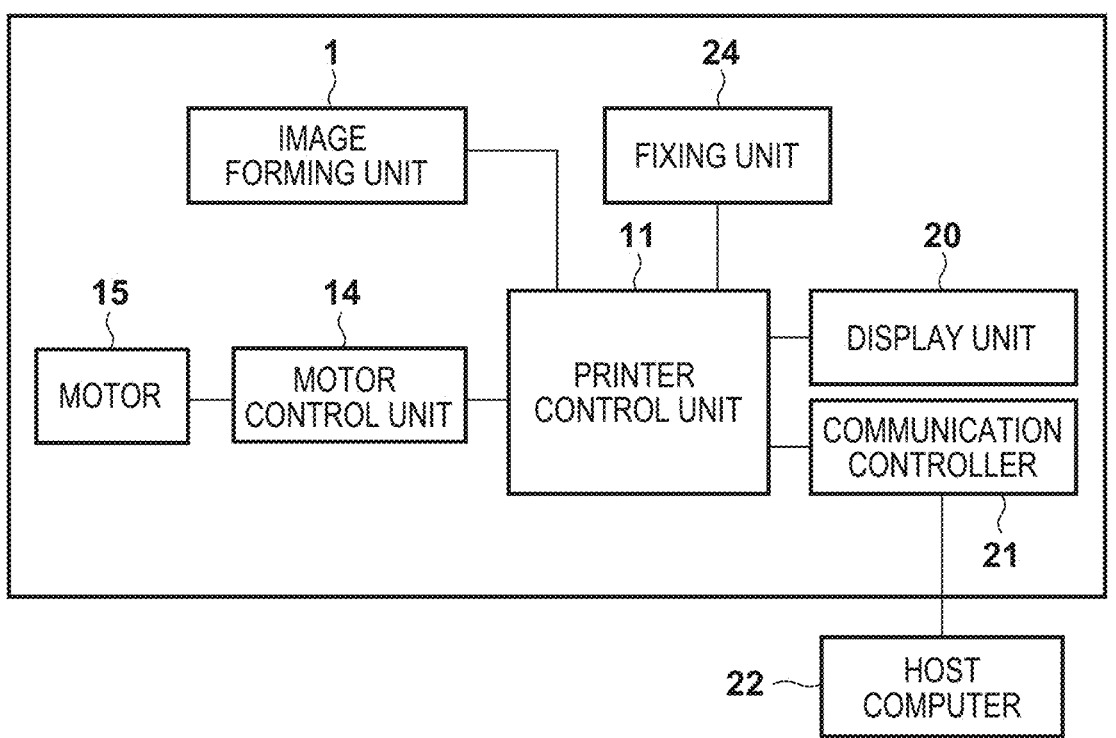

F I G. 3

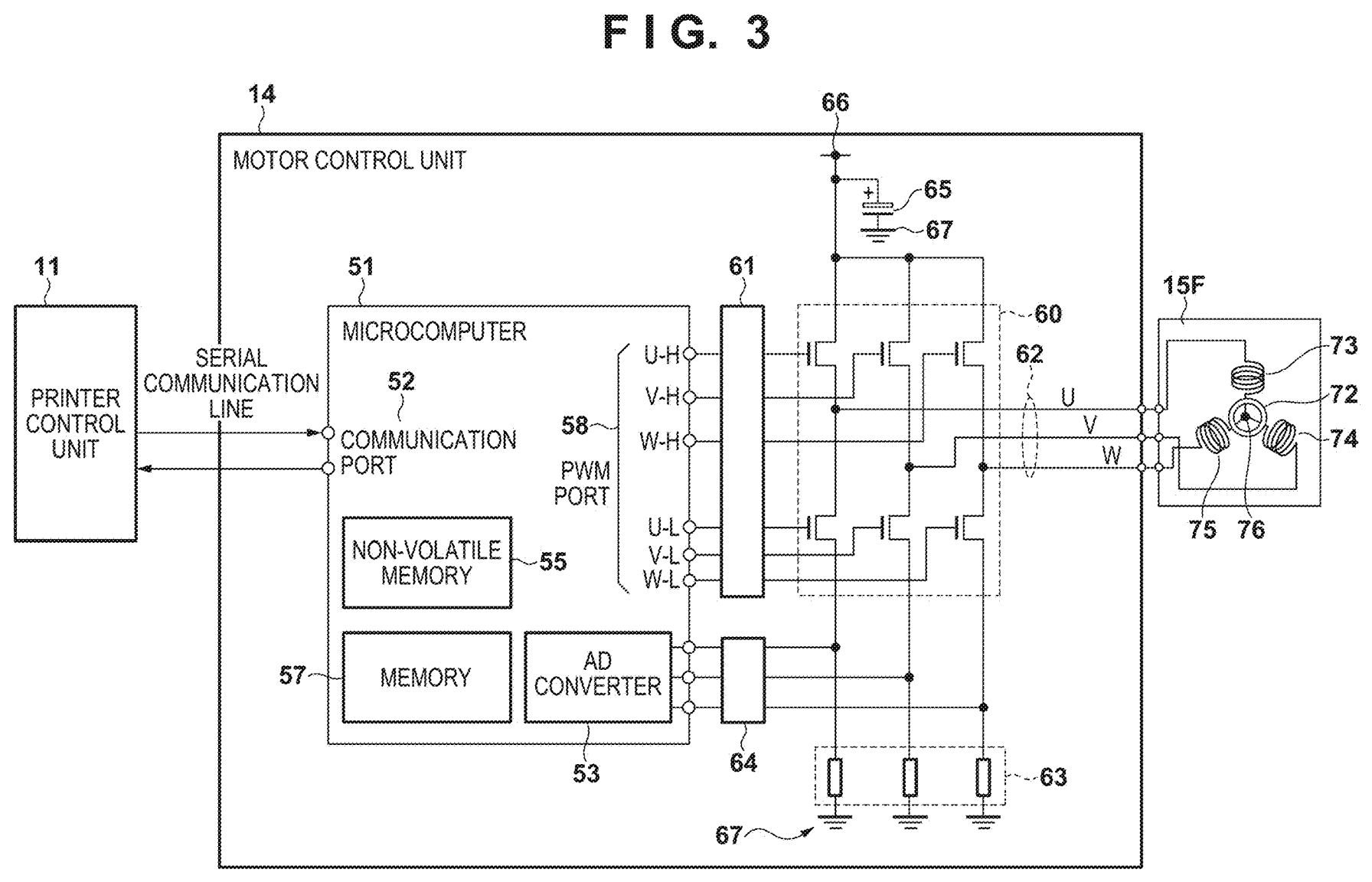

MOTOR CONTROL UNIT 14

MICROCOMPUTER 51

52

COMMUNICATION PORT

NON-VOLATILE MEMORY 55

MEMORY 57

AD CONVERTER 53

PWM PORT 58

U-H
V-H
W-H
U-L
V-L
W-L

61

62 60

65
67

66

63

64

67

65

U
V
W

15F 73
72
74
75
76

PRINTER CONTROL UNIT 11

SERIAL COMMUNICATION LINE

F I G.  4A
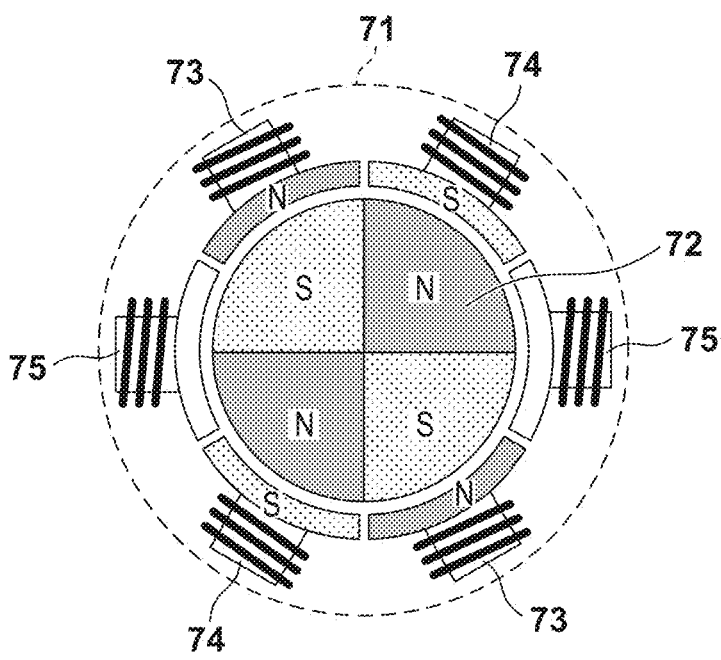
F I G.  4B
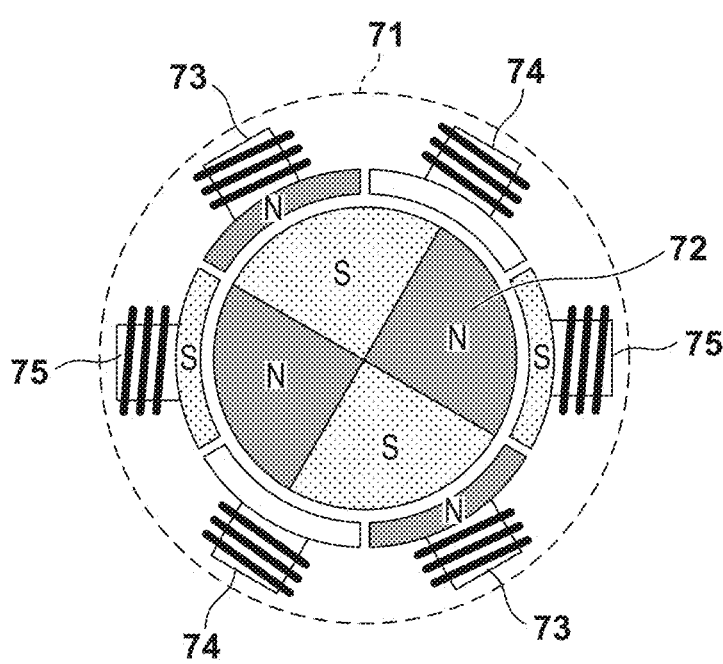

F I G.  6
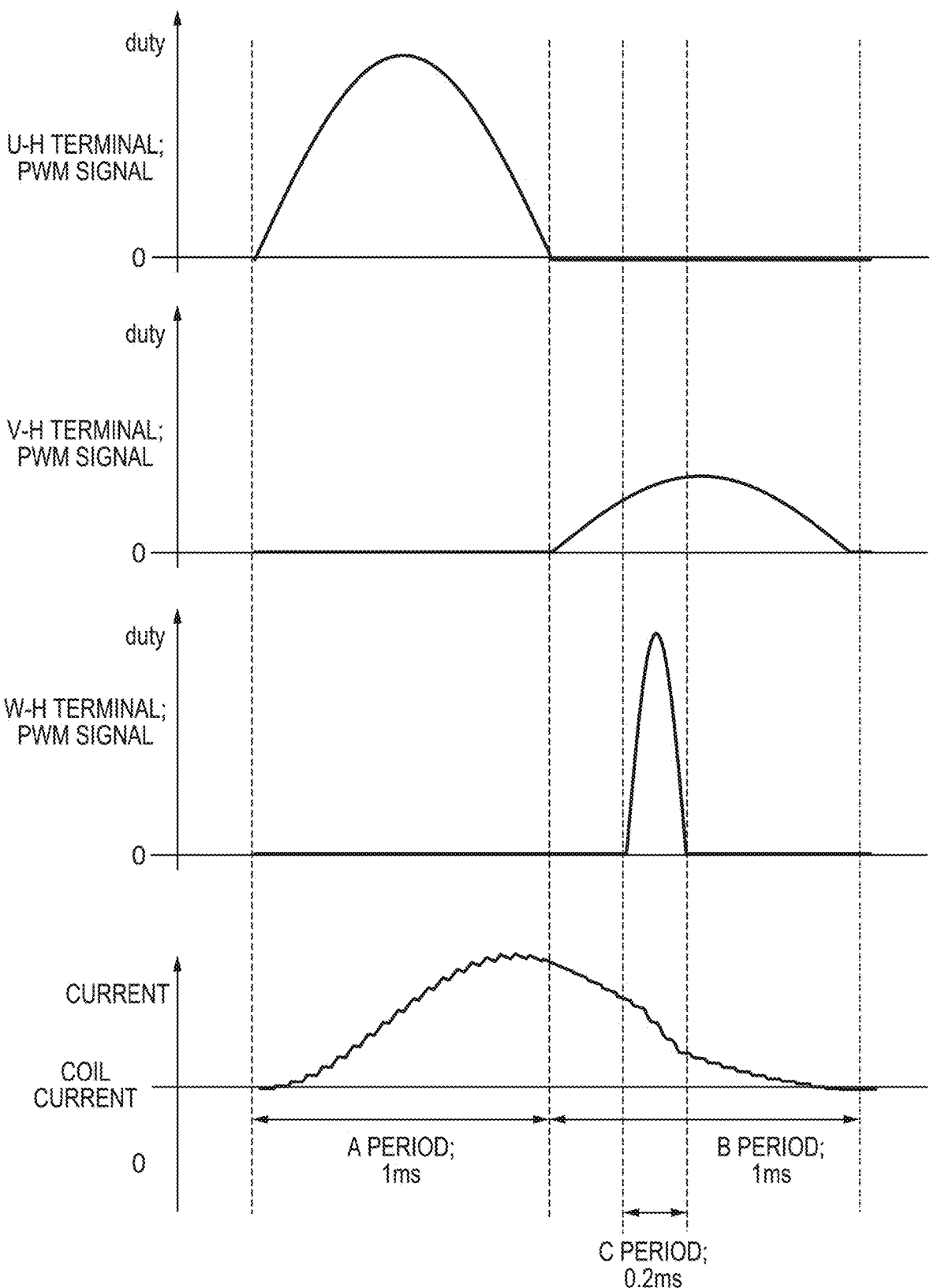

F I G.  8

| No. | #1 | #2 |
|-----|-----|-----|
| 1 | 15 | 70 |
| 2 | 30 | 100 |
| 3 | 45 | 70 |
| 4 | 58 | 0 |
| 5 | 70 | – |
| 6 | 80 | – |
| 7 | 89 | – |
| 8 | 95 | – |
| 9 | 98 | – |
| 10 | 100 | – |
| 11 | 98 | – |
| 12 | 95 | – |
| 13 | 89 | – |
| 14 | 80 | – |
| 15 | 70 | – |
| 16 | 58 | – |
| 17 | 45 | – |
| 18 | 30 | – |
| 19 | 15 | – |
| 20 | 0 | – |

F I G.  10
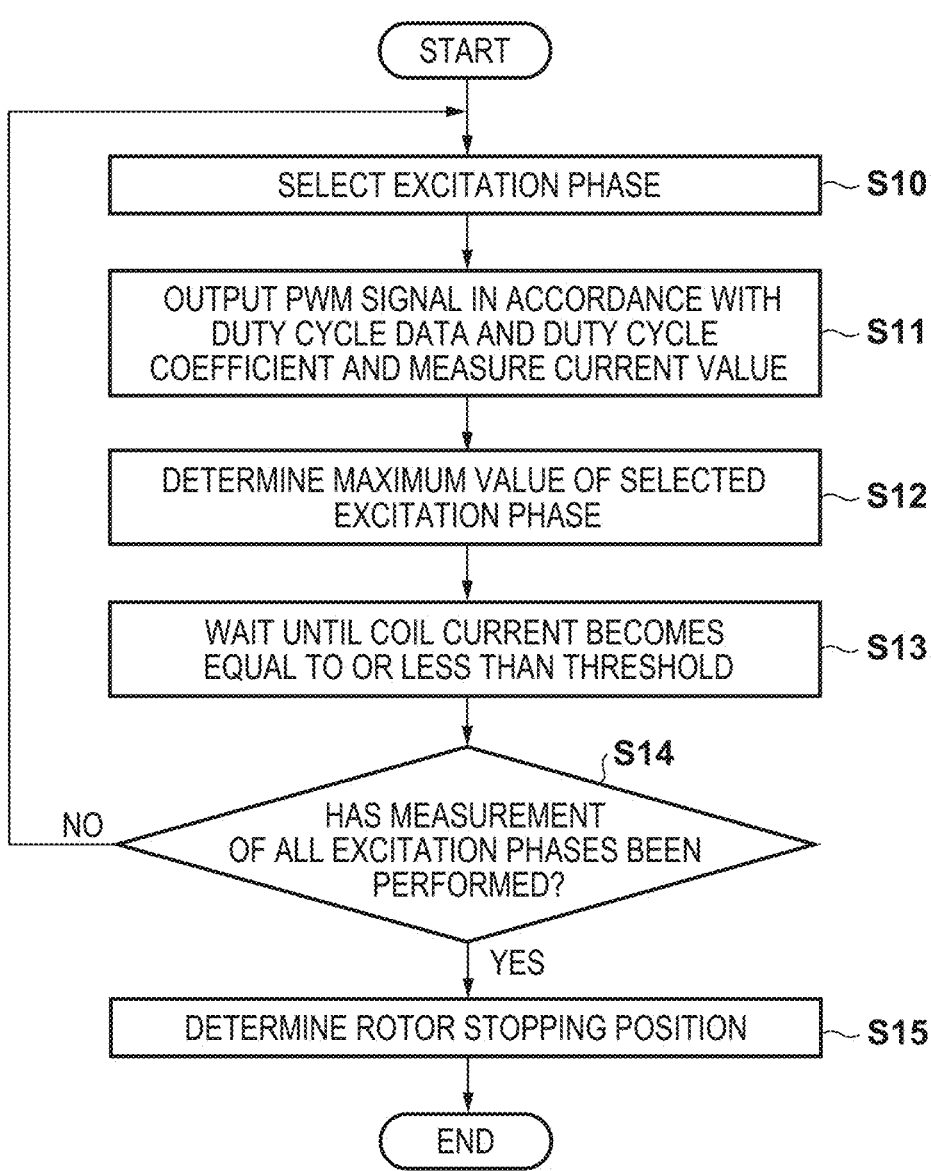

FIG. 11

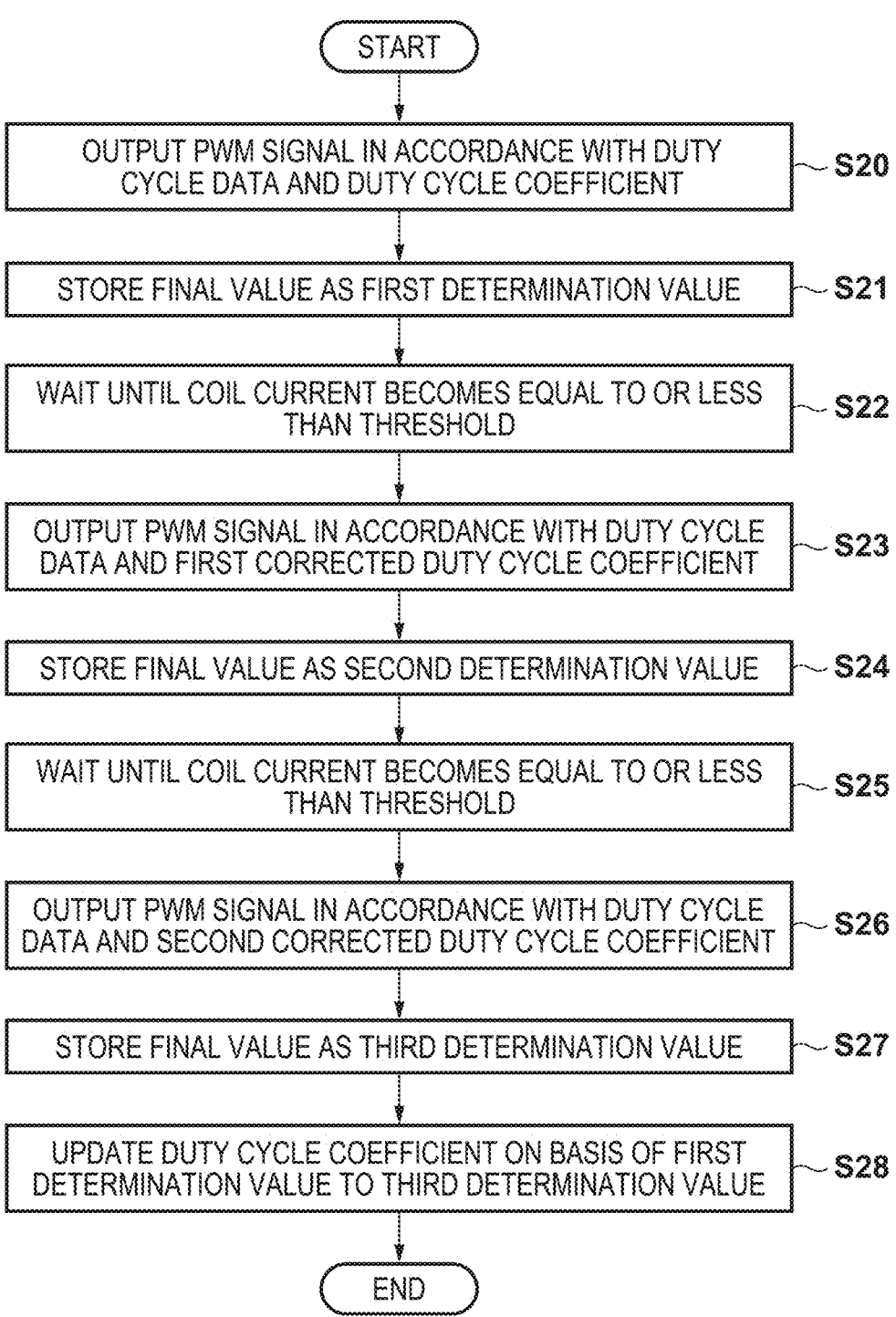

START

OUTPUT PWM SIGNAL IN ACCORDANCE WITH DUTY CYCLE DATA AND DUTY CYCLE COEFFICIENT — S20

STORE FINAL VALUE AS FIRST DETERMINATION VALUE — S21

WAIT UNTIL COIL CURRENT BECOMES EQUAL TO OR LESS THAN THRESHOLD — S22

OUTPUT PWM SIGNAL IN ACCORDANCE WITH DUTY CYCLE DATA AND FIRST CORRECTED DUTY CYCLE COEFFICIENT — S23

STORE FINAL VALUE AS SECOND DETERMINATION VALUE — S24

WAIT UNTIL COIL CURRENT BECOMES EQUAL TO OR LESS THAN THRESHOLD — S25

OUTPUT PWM SIGNAL IN ACCORDANCE WITH DUTY CYCLE DATA AND SECOND CORRECTED DUTY CYCLE COEFFICIENT — S26

STORE FINAL VALUE AS THIRD DETERMINATION VALUE — S27

UPDATE DUTY CYCLE COEFFICIENT ON BASIS OF FIRST DETERMINATION VALUE TO THIRD DETERMINATION VALUE — S28

END

F I G.  12
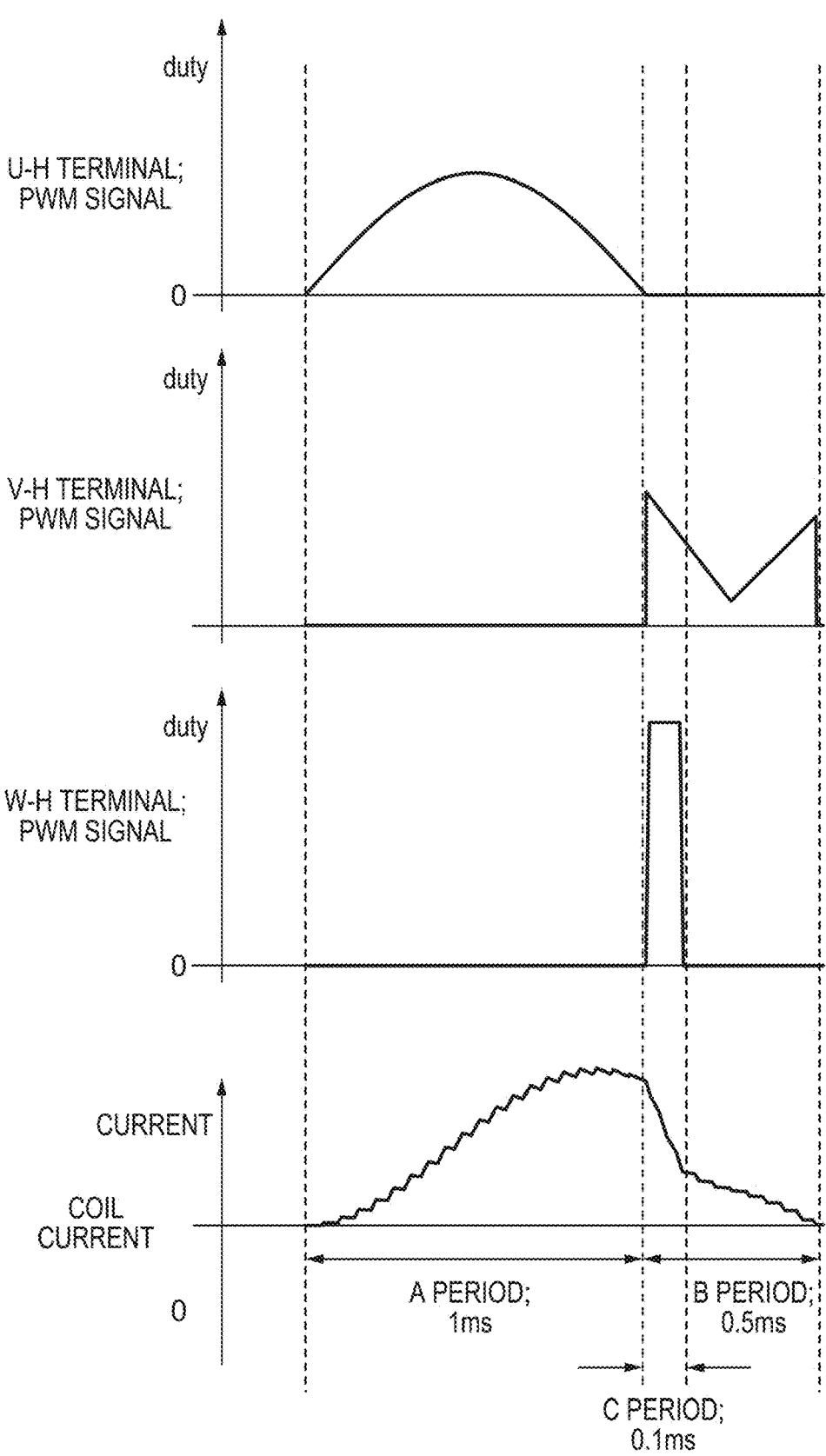

F I G.  13

| No. | #1 | #2 | #3 |
|-----|-----|-----|-----|
| 1 | 15 | 100 | 100 |
| 2 | 30 | 81 | 100 |
| 3 | 45 | 63 | - |
| 4 | 58 | 45 | - |
| 5 | 70 | 27 | - |
| 6 | 80 | 25 | - |
| 7 | 89 | 39 | - |
| 8 | 95 | 53 | - |
| 9 | 98 | 67 | - |
| 10 | 100 | 81 | - |
| 11 | 98 | - | - |
| 12 | 95 | - | - |
| 13 | 89 | - | - |
| 14 | 80 | - | - |
| 15 | 70 | - | - |
| 16 | 58 | - | - |
| 17 | 45 | - | - |
| 18 | 30 | - | - |
| 19 | 15 | - | - |
| 20 | 0 | - | - |

IMAGE FORMING APPARATUS THAT DETECTS STOPPING POSITION OF ROTOR OF MOTOR

BACKGROUND OF THE INVENTION

Field of the Invention

The present invention relates to technology for controlling a motor in an image forming apparatus.

Description of the Related Art

A sensorless DC brushless motor without a sensor for detecting the rotor position is used as a drive source for rotating members in image forming apparatuses. To prevent step-out and reverse rotation upon start up in a sensorless DC brushless motor, the stopping position of the rotor (hereinafter, rotor stopping position) is detected and startup processing in accordance with the rotor stopping position is executed. US-2015-0145454 discloses a configuration in which an excitation current (coil current) flows through each one of a plurality of excitation phases of a motor and the rotor stopping position is detected on the basis of the current value of the coil current flowing when each excitation phase is excited.

In an image forming apparatus, the amount of time required for printing can be reduced by reducing the startup time of the motor. The startup time of the motor can be effectively reduced by reducing the amount of time required to detect the rotor stopping position. To detect the rotor stopping position, it is necessary for a coil current to flow through each one of the plurality of excitation phases and for the current values to be measured. However, measurement of an excitation phase cannot start until the current value of the coil current running through the previous excitation phase has become sufficiently small. Accordingly, the amount of time required to detect the rotor stopping position can be reduced by making the coil current flowing through an excitation phase quickly attenuate.

However, by making the coil current quickly attenuate, the regenerative current to the power supply may become large and the power supply voltage may increase. The regenerative current can be suppressed by increasing the capacity of the electrolytic capacitor connecting to the power supply line, but this increases costs and the size of the image forming apparatus.

SUMMARY OF THE INVENTION

According to an aspect of the present disclosure, an image forming apparatus that forms an image on a sheet conveyed along a conveying path is provided. The image forming apparatus includes: a rotating member; a motor configured to drive the rotating member, the motor including at least three coils, and first terminals of the at least three coils being connected to one another; and a motor control unit configured to control the motor by controlling a potential of second terminals different from the first terminals of the at least three coils, the motor control unit detecting a stopping position of a rotor of the motor by executing measuring processing on each of a plurality of excitation phases indicated by a permutation of two coils from among the at least three coils, the measuring processing including performing control so that a coil current flows from a first coil to a second coil of the at least three coils and measuring a current value of the coil current. The motor control unit is configured to: perform control so that the coil current flows from the first coil toward the second coil in a first period of the measuring processing, perform control so that the coil current flowing from the first coil toward the second coil in the first period attenuates in a second period following the first period, and perform control so that a portion of the coil current flowing from the first coil toward the second coil flows from the second terminal of the second coil, via the second terminal of a third coil different from the first coil and the second coil from among the at least three coils, to the third coil in a third period within the second period.

Further features of the present invention will become apparent from the following description of exemplary embodiments with reference to the attached drawings.

BRIEF DESCRIPTION OF THE DRAWINGS

FIG. 1 is a configuration diagram of an image forming apparatus according to some embodiments.

FIG. 2 is a control configuration diagram of an image forming apparatus according to some embodiments.

FIG. 3 is a configuration diagram of a motor control unit according to some embodiment.

FIGS. 4A and 4B are configuration diagrams of a motor according to some embodiments.

FIG. 6 is a diagram illustrating PWM signals and a coil current according to some embodiments.

FIG. 8 is a diagram illustrating duty cycle data according to some embodiments.

FIG. 10 is a flowchart of processing for detecting a rotor stopping position according to some embodiments.

FIG. 11 is a flowchart of processing for updating a duty cycle coefficient according to some embodiments.

FIG. 12 is a diagram illustrating PWM signals and a coil current according to some embodiments.

FIG. 13 is a diagram illustrating duty cycle data according to some embodiments.

DESCRIPTION OF THE EMBODIMENTS

Figure 5:
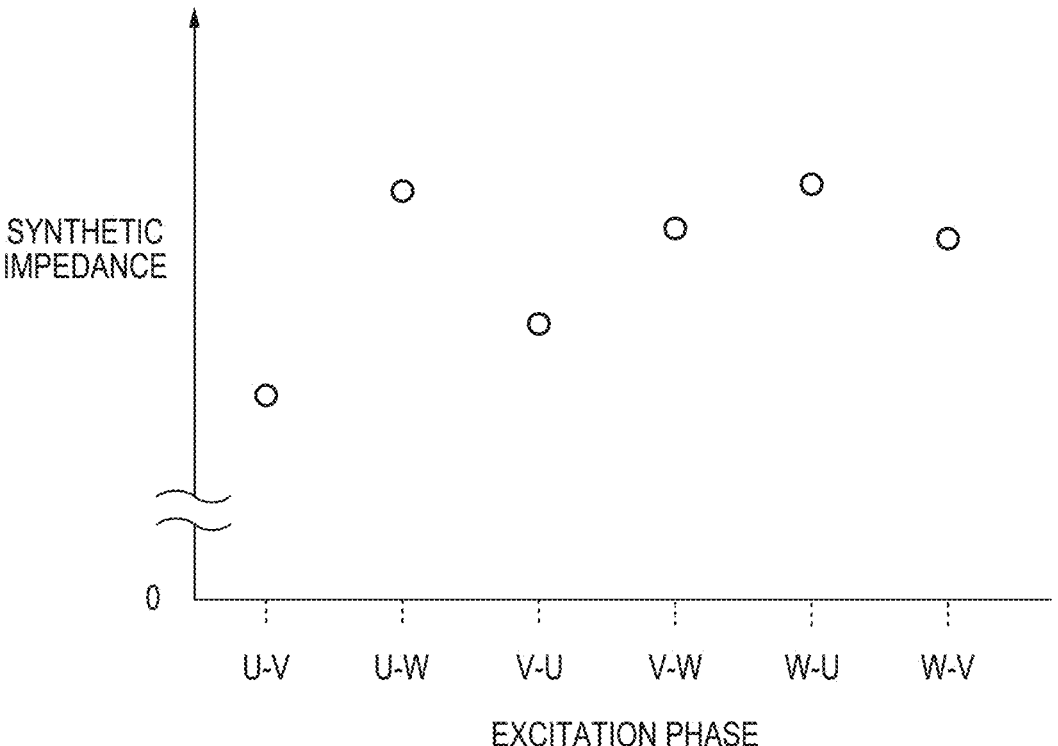
FIG. 5 is a diagram illustrating the relationship between excitation phases and synthetic impedance according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus of the present embodiment. The image forming apparatus may be any one of a printing apparatus, a printer, a copy machine, a multi-function peripheral, and a facsimile machine, for example. A sheet stored in a cassette 25 of the image forming apparatus is conveyed along a conveying path by a feeding roller 26 and a conveyance roller 27. An image forming unit 1 forms a yellow, magenta, cyan, and black toner image and transfer these toner images onto the sheet conveyed along the conveying path. A fixing device 24 includes a heating roller and the pressure roller and applies heat and pressure to the sheet with the transferred toner images to fix the toner images to the sheet. After toner image fixing processing is performed on the sheet, the sheet is discharged to the outside of the image forming apparatus. A motor 15F is a drive source that rotates the roller of the fixing device 24. The motor 15F may be a sensorless motor without a sensor for detecting the rotor position. Note that the image forming apparatus illustrated FIG. 1 is a color image forming apparatus that forms images using toner images of four colors. However, for example, the image forming apparatus may be a monochrome image forming apparatus that forms images using only black toner. Also, the image forming apparatus of FIG. 1 is an electro-photographic image forming apparatus. However, the image forming apparatus may be any type of image forming apparatus including an inkjet image forming apparatus or the like.

FIG. 2 illustrates the control configuration of the image forming apparatus. When image data of an image to be formed is received from a host computer 22 via a communication controller 21, a printer control unit 11 controls the image forming unit 1 to form a toner image on a sheet and controls the fixing device 24 to fix the toner image on the sheet. Also at this time, the printer control unit 11 controls a motor control unit 14 to perform rotation control of each motor 15 including the motor 15F. The motors 15 are drive sources for a roller of the fixing device 24, a roller of a conveying unit that conveys the sheet along the conveying path, a rotating member included in the image forming unit 1, and the like. Note that the conveying unit includes feeding roller 26 and the conveyance roller 27. Also, the rotating member of the image forming unit 1 includes a photosensitive body, a developing roller, and the like, for example. Also, the printer control unit 11 displays the state of the image forming apparatus on a display unit 20. Note that the printer control unit 11 includes one or more processors and memory, for example. The memory stores various types of control programs and data, and the one or more processors control each unit of the image forming apparatus on the basis of the various types of control programs and data stored in the memory.

FIG. 3 illustrates an example of the configuration of the motor control unit 14. The motor control unit 14 includes a microcomputer 51. The microcomputer 51 communicates with the printer control unit 11 via a communication port 52. The microcomputer 51 outputs a pulse width modulation signal (PWM signal) from a PWM port 58. In the present embodiment, the microcomputer 51, for the coils of the three phases (U phase, V phase, W phase) of the motor 15F, outputs a total of six PWM signals, namely high-side PWM signals (U-H, V-H, W-H) and low-side PWM signals (U-L, V-L, W-L). Accordingly, the PWM port 58 includes six terminals U-H, V-H, W-H, U-L, V-L, W-L. Each terminal of the PWM port 58 is connected to a gate driver 61.

An inverter 60 includes a total of six switching elements corresponding to the PWM signals output from the PWM port 58 in a 1-to-1 relationship. In other words, the inverter 60 includes switching elements corresponding to U-H, V-H, W-H, U-L, V-L, and W-L. An FET can be used as the switching element, for example. The gate driver 61 controls the on/off of the switching elements corresponding to the PWM signals of the inverter 60 on the basis of the PWM signals from the PWM port 58. In the present embodiment, when the PWM signal is at a high level, the corresponding switching element is turned on, and when the PWM signal is at a low level, the corresponding switching element is turned off. An output 62 of the inverter 60 is connected to a second terminal of coil 73 (U phase), 74 (V phase), and 75 (W phase) of the motor. Note that first terminals different from the second terminals of the coils 73, 74, and 75 are connected to one another and form a neutral 76, which is where the first terminals of the coils 73, 74, and 75 are disposed. The motor 15F includes a rotor 72.

The inverter 60 is connected to a power supply terminal 66 (third terminal) connected to a non-illustrated DC power supply, and the inverter 60 and the motor 15F run on the power from the DC power supply. The potential of a power supply terminal 66 is +24 V, for example. Also, a bulk electrolytic capacitor 65 is connected in parallel with the inverter 60 between the power supply terminal 66 and a ground terminal 67 (fourth terminal). The bulk electrolytic capacitor 65 absorbs the regenerative current and supplies current to the inverter 60.

The microcomputer 51 can controls the voltage applied to each coil 73 to 75 by controlling each switching element of the inverter 60 via PWM signals. In this manner, the microcomputer 51 adjusts the current value of the coil current flowing through each coil 73 to 75 to control the rotation of the motor 15F. In other words, the microcomputer 51 and the inverter 60 controls the rotation of the motor 15F by controlling the potential of the second terminal of each coil of the motor 15F.

The coil current flowing through each coil 73, 74, and 75 is converted into voltage by a resistance 63 corresponding to the U phase, the V phase, and the W phase. The voltage of the resistance 63 corresponding to the U phase, the V phase, and the W phase is input into an AD converter 53 of the microcomputer 51 via an amplifier 64. The terminal of the resistance 63 that is not the terminal connected to the inverter 60 is connected to the ground terminal 67. The AD converter 53 converts the input voltage into a digital value. The microcomputer 51 detects the current value of the coil current flowing through each coil 73, 74, and 75 on the basis of the digital value. In this manner, the resistance 63, the amplifier 64, and the microcomputer 51 form a current detection unit that detects the current values of the coil currents. Also, the microcomputer 51 includes a non-volatile memory 55 that stores various types of data and the like used in controlling the motor 15F and a volatile memory 57.

Each coil 73, 74, and 75 can be set to a first state, a second state, or a third state via the switching elements of the inverter 60. The first state is a state in which the second terminal of the coil is connected to the power supply terminal 66 of a first potential (for example, +24 V) by only the high-side switching element corresponding to the coil being turned on. The second state is a state in which the second terminal of the coil is connected to the ground terminal 67 of a second potential (for example, ground potential) lower than the first potential via the resistance 63 by only the low-side switching element corresponding to the coil being turned on. The third state is a state in which the second terminal of the coil is not connected to either the power supply terminal 66 or the ground terminal 67, meaning that the second terminal is in an open state, by the high-side and low-side switching element corresponding to the coil being both turned off. In this manner, the inverter 60 functions as a setting unit that sets the state of each coil to the first state, the second state, or the third state and as a switching unit that switches the state of each coil between the first state, the second state, and the third state.

FIGS. 4A and 4B are diagrams illustrating examples of the configuration of the motor 15F. The motor 15F includes a six-slot stator 71 and the four-pole rotor 72. The stator 71 is provided with the U-phase coil 73, the V-phase coil 74, and the W-phase coil 75. The rotor 72 is formed of a permanent magnet and includes two N pole and S pole pairs. The stopping position of the rotor 72 depends on the excitation phase. Note that in the present embodiment, an excitation phase is indicated by a permutation of two coils from among the coils 73, 74, and 75. In other words, there are six excitation phases in total, namely U-V, U-W, V-U, V-W, W-U, W-V Here, exciting the U-V phase means exciting so that a coil current flows from the U-phase coil 73 toward the V-phase coil 74 via the neutral 76. For example, when the U-V phase is excited, the rotor 72 stops at the rotational position illustrated in FIG. 4A. Note that at this time, the U phase is an N pole and the V phase is an S pole. Next, when the U-W phase is excited, the rotor 72 stops at the rotational position illustrated in FIG. 4B.

If the driving of the motor 15F is stopped and the coil current made 0, the force holding the rotor 72 stops acting, and the rotor 72 can be rotated by the application of a rotational force from the outside of the rotor 72. Thus, when the fixing device 24 is attached or removed from the image forming apparatus or when a jammed sheet shut in the fixing device 24 is removed, the rotor 72 can rotate. At this time, the motor control unit 14 becomes unable to determine the stopping position of the rotor 72. Also, just after power is supplied to the image forming apparatus, the motor control unit 14 does not determine the stopping position of the rotor 72. Thus, in a case where the motor 15F is to be rotated, the motor control unit 14 first executes processing to detect the stopping position of the rotor 72.

Here, typically, a coil such as the coils 73, 74, and 75 has a configuration in which a copper wire is wound around a core formed from stacked electromagnetic steel sheets. The magnetic permeability of the electromagnetic steel sheets decreases when an external magnetic field is present. The inductance of the coil is proportional to the magnetic permeability of the core. Thus, when the magnetic permeability of the core is decreased, the inductance of the coil is also decreased. For example, since the U-phase coil 73 in FIG. 4A faces only the S pole of the rotor 72, the degree of reduction in the inductance of the U-phase coil 73 is greater than that of the W-phase coil 75 facing both the S pole and the N pole of the rotor 72. Also, the amount of change in the inductance is different depending on whether the direction of the external magnetic field and the direction of the magnetic field produced by the coil current are the same or opposite direction. Specifically, in the state of FIG. 4A, when the direction of the magnetic field generated by the U-phase coil 73 is the same as the direction of the magnetic field produced by the opposing S pole of the rotor 72, that is, a coil current flows so that the U phase is an N pole, the amount of decrease in the inductance is greater than in a case where a coil current flows in a direction so that the U phase is an S pole. In this manner, the value of the detected inductance is different depending on the stopping position of the rotor 72 and the excitation phase to be excited. Also, the iron loss of a coil changes depending on changes in the inductance, and thus the resistance component of the coil also changes. Hereinafter, the coil inductance component and the resistance component will be collectively referred to as the coil impedance.

FIG. 5 illustrates the synthetic impedance observed upon excitation of each excitation phase when the rotor 72 is stopped at a position where the U-V phase is excited.

Hereinafter, the stopping position of the rotor 72 when the X-Y phase is excited is referred to as the "X-Y phase position". Since the rotor 72 is stopped at the U-V phase position, the synthetic impedance when the U-V phase is excited is less than the synthetic impedance when other excitation phases are excited. Accordingly, the position of the rotor 72 can be determined by determining the relative magnitude relationship of the synthetic impedance of each excitation phase. In the present embodiment, as described below, the measuring processing to excite the excitation phases and measure the coil currents is executed in order on each excitation phase. Then, the stopping position of the rotor 72 is detected on the basis of the current values of the coil currents measured for each excitation phase.

The measuring processing for each excitation phase is similar, and hereinafter, the measuring processing will be described using the U-V phase as a representative. The U-phase coil 73 (first coil) and the V-phase coil 74 (second coil), which are excitation targets in the U-V phase measuring processing will be referred to below as the excitation coils, and the W-phase coil 75 (third coil) not included in the excitation phase will be referred to below as the non-excitation coil. As illustrated in FIG. 6, the time period of the measuring processing for one excitation phase is divided into an A period (first period) and a B period (second period). Also, a C period (third period) is set inside the B period. The A period is a time period in which the inverter 60 is controlled so that a coil current flows from the U-phase coil 73 toward the V-phase coil 74. The B period is a time period in which the inverter 60 is controlled so that the coil current flowing from the U-phase coil 73 toward the V-phase coil 74 in the A period attenuates. Ideally, the current value of the coil current is 0 at the time when the B period ends, but in practice, the current value of the coil current may be a positive or negative value at the end timing of the B period. Note that in a case where the current value is a positive value, the coil current is flowing from the U-phase coil 73 toward the V-phase coil 74. Note that in a case where the current value is a negative value, the coil current is flowing from the V-phase coil 74 toward the U-phase coil 73.

First the A period will be described. In the A period, the microcomputer 51 outputs a PWM signal that changes the high-level duty cycle to a sine wave from the U-H terminal. Note that though not illustrated, the microcomputer 51 outputs a PWM signal with polarity inverted from that of the PWM signal output from the U-H terminal from the U-L terminal (hereinafter, complementary PWM signal). Thus, in the A period, the second terminal of the U-phase coil 73 is connected to the power supply terminal 66 while the PWM signal output from the U-H terminal is a high level and connected to the ground terminal 67 via the resistance 63 while the PWM signal is a low level. In other words, in the A period, the U-phase coil 73 is alternately set to the first state and the second state. Note that a setting period (third setting period) from when the U-phase coil 73 is set in the first state to when the U-phase coil 73 is set in the second state corresponds to a high-level period of the PWM signal output from the U-H terminal. As illustrated in FIG. 6, this setting period increases as time passes in the A period and then decreases.

Also, in the A period, the microcomputer 51 outputs low level (duty cycle of 0%) from the V-H terminal and the W-H terminal. Also, though not illustrated, in the A period, the microcomputer 51 outputs high level (duty cycle of 100%) from the V-L terminal. Thus, the second terminal of the V-phase coil 74 connects to the ground terminal 67 via the resistance 63. Also, though not illustrated, the microcomputer 51 outputs low level from the W-L terminal. In other words, in the A period, the V-phase coil 74 is set to the second state, and the W-phase coil 75 is set to the third state.

In the B period (second period) following the A period, the microcomputer 51 outputs a PWM signal that changes the high-level duty cycle to a sine wave from the V-H terminal and the complementary PWM signal for the PWM signal output from the V-H terminal from the V-L terminal. In other words, in the B period, the V-phase coil 74 is alternately set to the first state and the second state. Note that a setting period (first setting period) from when the V-phase coil 74 is set in the first state to when the V-phase coil 74 is set in the second state corresponds to a high-level period of the PWM signal output from the V-H terminal. As illustrated in FIG. 6, this setting period increases as time passes in the B period and then decreases. Note that in the B period, the microcomputer 51 outputs low level from the U-H terminal and, though not illustrated, high level from the U-L terminal. In other words, in the B period, the U-phase coil 73 is set to the second state.

Also, though not illustrated, in the B period, the microcomputer 51 outputs low level from the W-L terminal. Also, as illustrated in FIG. 6, in the B period excluding the C period, the microcomputer 51 outputs low level from the W-H terminal. In the C period (third period), the microcomputer 51 outputs a PWM signal that changes the duty cycle to a sine wave from the W-H terminal. In other words, in the B period excluding the C period, the W-phase coil 75 is set to the third state, and in the C period, the W-phase coil 75 is set alternately between the first state and the third state. Note that in the C period, a setting period (second setting period) from when the W-phase coil 75 is set in the first state to when the W-phase coil 75 is set in the third state corresponds to a high-level period of the PWM signal output from the W-H terminal. As illustrated in FIG. 6, this setting period increases as time passes in the C period and then decreases.

In the A period, the coil current flows from the power supply terminal 66, through the U-phase high-side switching element, the U-phase coil 73, the V-phase coil 74, the V-phase low-side switching element, and the resistance 63 for the V phase, and to the ground terminal 67. Note that a portion of the coil current may also be supplied from the bulk electrolytic capacitor 65. As illustrated in FIG. 6, the current value of the coil current in the A period increases with a delay after an increase in the duty cycle of the PWM signal output from the U-H terminal due to the inductance of the coil. In the B period excluding the C period, the coil current flows from the ground terminal 67, through the resistance 63 for the U phase, the U-phase low-side switching element, the U-phase coil 73, the V-phase coil 74, and the V-phase high-side switching element, and to the power supply terminal 66. In other words, the coil current flows to the non-illustrated DC power supply via the power supply terminal 66 as a regenerative current. Note that a portion of the coil current flows to the bulk electrolytic capacitor 65 and not the power supply terminal 66. In the C period, since the W-phase high-side switching element is on, a portion of the coil current flowing from the V-phase coil 74 toward the V-phase high-side switching element flows to the W-phase coil 75 via the W-phase high-side switching element and not the power supply terminal 66. The current flowing to the W-phase coil 75 then flows to the V-phase coil 74 via the neutral 76. The coil current of FIG. 6 indicates the current value (absolute value) of the current toward the inverter 60 in the A period and the current value (absolute value) of the current from the inverter 60 toward the power supply terminal in the B period.

In this manner, in the B period for attenuating the coil current, by a portion of the coil current flowing to the non-excitation coil not included in the excitation phase, the current value of the regenerative current flowing into the DC power supply can be decreased. Thus, even in the case of a short B period for hastening the attenuation of the coil current, an increase in the regenerative current flowing to the DC power supply can be suppressed, which in turn suppresses an increase in the power supply voltage. Accordingly, the B period can be shortened to reduce the amount of time required to detect the rotor stopping position.

The duration of the A period and the maximum value of the duty cycle are determined on the basis of the necessary detection accuracy under the condition that the rotor 72 does not rotate. In the present example, the duration of the A period is 1 ms, and the maximum value of the duty cycle is 65%. The duration of the B period and the maximum value of the duty cycle are set so that the increase value of the power supply voltage due to the regenerative current is kept equal to or less than a predetermined value and the coil current is approximately zero at the end timing of the B period. Note that to make the coil current approximately zero at the end timing of the B period, the time integrated value of the voltage produced in the inductance component of the coil in the A period is made approximately zero. In the present example, the duration of the B period is 1 ms, the same as the A period, and the maximum value of the duty cycle is 24%.

The start timing of the C period, for example, is set to a time period in which the current value of the regenerative current becomes large. The duration of the C period and the maximum value of the duty cycle are set so that the coil current flowing to the W-phase coil 75 attenuates to approximately zero within the B period. In the present example, the start timing of the C period is set to 0.25 ms after the start timing of the B period, the duration is set to 0.2 ms, and the maximum value of the duty cycle is set to 70%. Note that the relationship between the elapsed time and the duty cycle in the B period may be adjusted by correcting the duty cycle coefficient described below. The maximum value of the duty cycle of the C period is determined taking into account adjustment of the duty cycle of the B period.

Figure 7:
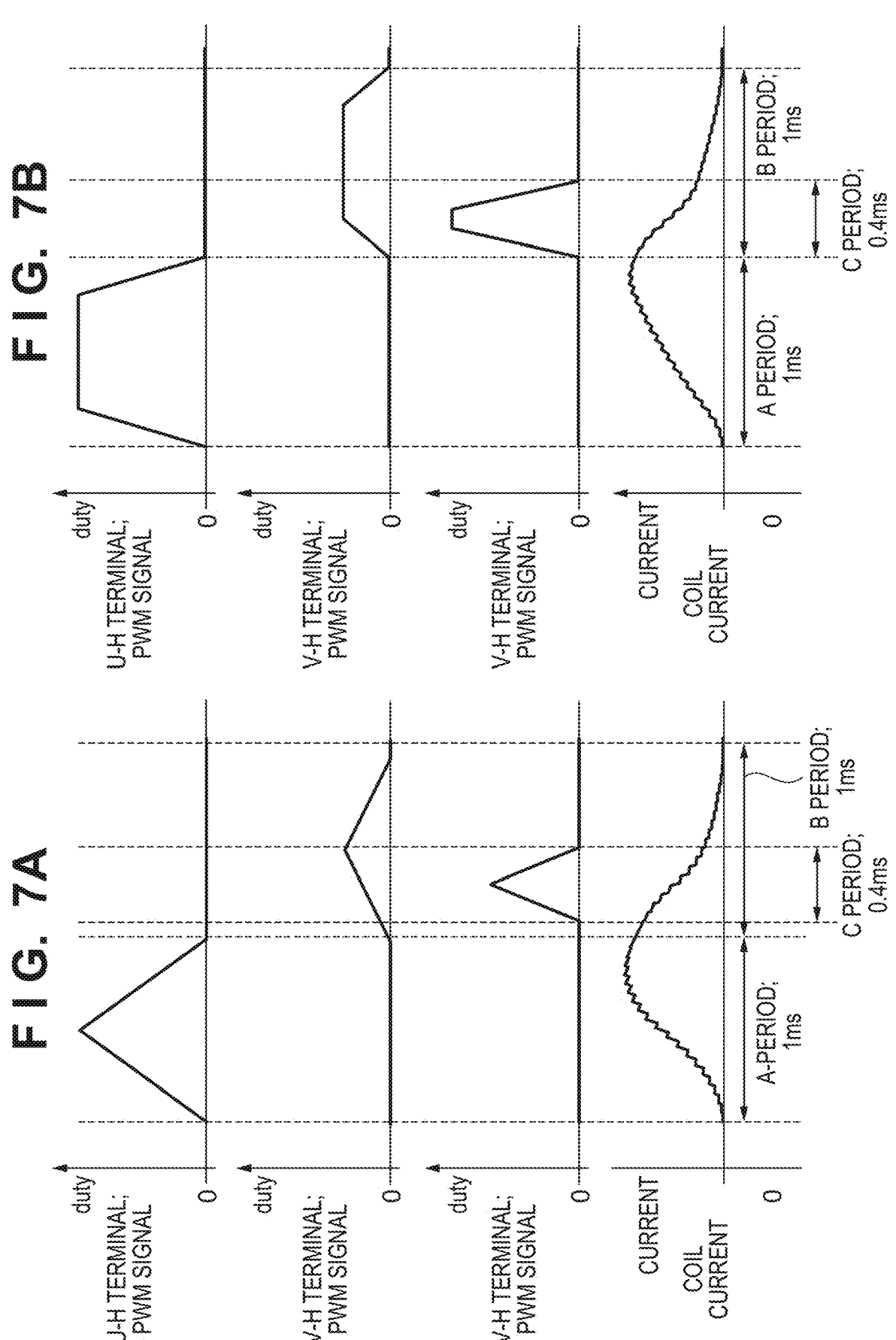
FIGS. 7A and 7B are diagrams illustrating PWM signals and coil currents according to some embodiments.

Note that the change in the duty cycle of the PWM signal applied to each coil, that is, the shape of the voltage waveform applied to the coil, may be a triangular wave-like shape or a trapezoidal wave-like shape as illustrated in FIGS. 7A and 7B. More typically, the shape of the voltage waveform applied to the coil can be one that, in each period, increases toward a maximum value and then decreases toward 0 after reaching the maximum value or at any subsequent timing. Also, the change in the duty cycle of the PWM signal applied to the coil can be a rectangular wave-like shape. In other words, in each time period, the duty cycle of the PWM signal applied to the coil can also be made constant. Also, the shapes of the changes in the duty cycles of the PWM signals in the A period, the B period, and the C period do not need to be the same.

In the present embodiment, the duty cycle data is pre-stored in the non-volatile memory 55 of the microcomputer 51. Also, the microcomputer 51 outputs a PWM signal that changes the duty cycle as illustrated in FIG. 6 and the like on the basis of the duty cycle data. FIG. 8 illustrates an example of duty cycle data in a case where the duty cycle of the PWM signal is changed to a sine wave as illustrated in FIG. 6. The duty cycle data is data indicating the relationship between the elapsed time and the duty cycle value in each period in a time series. #1 of FIG. 8 indicates reference data for the A period and the B period, and #2 indicates reference data for the C period. A duty cycle coefficient for the A period, the B period, and the C period are stored in the non-volatile memory 55, and the microcomputer 51 obtains the actual duty cycle value by multiplying the reference data by the duty cycle coefficient. In the present example, the duty cycle coefficient of the A period, the B period, and the C period is 0.65, 0.24, and 0.7, respectively. Since the maximum value of the duty cycle indicated by each reference data is 100, the maximum value of the duty cycle of the A period, the B period, and the C period is 65%, 24%, and 70%, respectively. Also, the microcomputer 51 switches the duty cycle each 50 s. Since the A period and the B are 1 ms in duration, the #1 reference data includes 20 time series values. Since the C period is 0.2 ms in duration, the #2 reference data includes 4 time series values.

Figure 9:
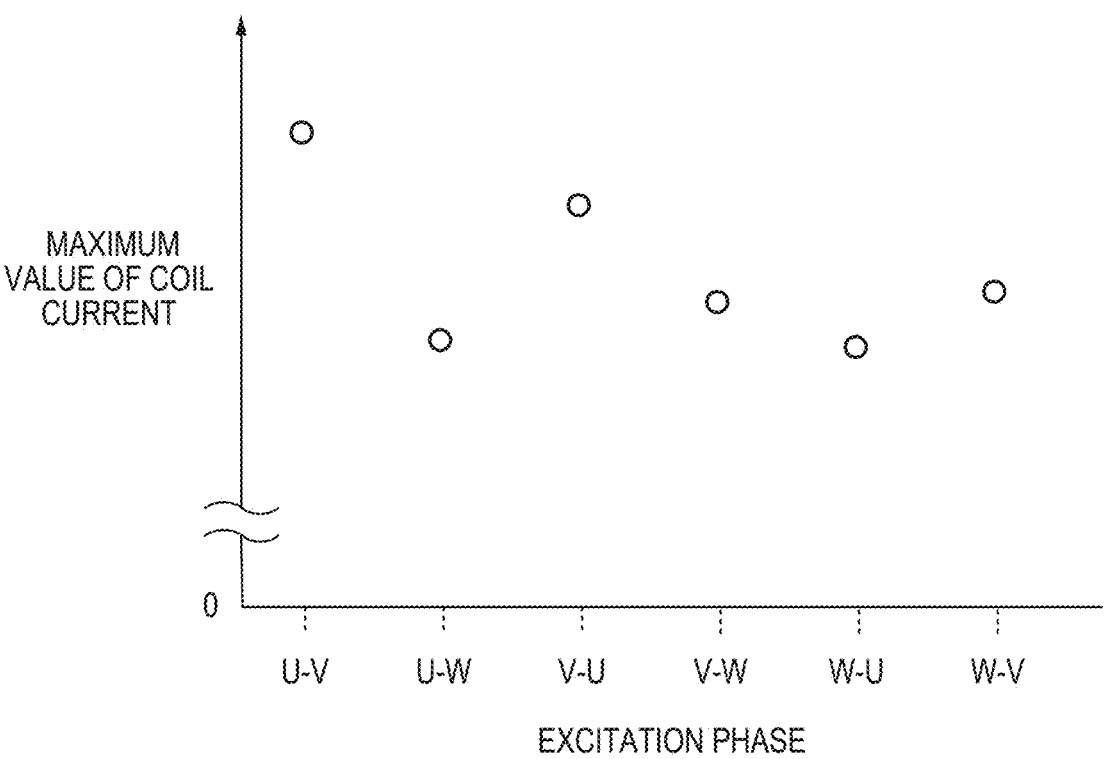
FIG. 9 is a diagram illustrating the relationship between excitation phases and maximum values of coil current according to some embodiments.

The microcomputer 51 detects the current value of the coil current in predetermined cycles for both the A period and the B period and stores the detected current value in the memory 57 as a measurement value. For example, the predetermined cycle is 50 s. When the B period ends, the microcomputer 51 determines the maximum value (absolute value) among the measurement values stored in the memory 57. As described above, the microcomputer 51 excites each of the six excitation phases and determines the maximum value for each excitation phase. FIG. 9 illustrates an example of the maximum values determined for the six excitation phases. According to FIG. 9, the maximum value when the U-V phase is excited is the largest. As described above, in a case where the rotor 72 is stopped at the X-Y phase position, the synthetic impedance measured when the X-Y phase is excited decreases to the smallest, and the current value of the coil current measured when the X-Y phase is excited increases to the largest. Thus, in the example of FIG. 9, the stopping position of the rotor 72 can be determined to be the U-V phase position.

Next, a method of correcting the duty cycle coefficient will be described. The duty cycle coefficient is determined in advance so that, initially, the coil current at the end timing of the B period approaches 0 in accordance with a standard parameter of the motor 15F. However, depending on variation in the characteristics of each motor 15F, the optimal duty cycle coefficient may be different for each individual motor 15F. Also, the optimal duty cycle coefficient may change over time due to the change over time of the motor 15F. Thus, in the present embodiment, the duty cycle coefficient of when a predetermined condition is satisfied is updated and corrected. The predetermined condition may be, for example, configured to be satisfied when the image forming apparatus is powered on or when restoring from a sleep state. Also, the predetermined condition can be a periodic condition or a condition based on the number of sheets an image is formed on. Furthermore, it can be configured so that the predetermined condition is satisfied when the current value (absolute value) of the coil current at the end timing of the B period is greater than a predetermined value. Note that in the present embodiment, three different duty cycle coefficients are used for the A period, the B period, and the C period, but the duty cycle coefficient to be updated is one. In the present embodiment, the duty cycle coefficient of the B period is updated, but the duty cycle coefficient of the A period and the C period may be updated. Note that the duty cycle coefficient is updated so that the current value of the coil current at the end timing of the B period approaches 0. Hereinafter, the current value of the coil current at the end timing of the B period will be referred to as the "final value".

For example, in a case where the final value is a negative value, that is, the coil current flows from the Y-phase coil toward the X-phase coil at the end timing of the B period with the X-Y phase excited, the duty cycle of the B period becomes too large. Thus, in such a case, the duty cycle coefficient is updated to a lower value than the current value. On the other hand, in a case where the final value is a positive value, that is, the coil current flows from the X-phase coil to the Y-phase coil with the X-Y phase excited, the duty cycle of the B period is too small. Thus, the duty cycle coefficient is updates to a larger value than the current value.

FIG. 10 is a flowchart of the processing for detecting the rotor stopping position executed by the motor control unit 14. In S10, the motor control unit 14 selects the excitation phase to excite. In S11, the motor control unit 14 executes the measuring processing on the excitation phase selected in S10. In other words, the motor control unit 14 outputs the PWM signal as described using FIGS. 6 and 7A and 7B on the basis of the duty cycle data and the duty cycle coefficient and repeatedly measures the current value of the coil current. The motor control unit 14 stores the repeatedly measured current value in the memory 57 as measurement values. When the B period ends, in S12, the motor control unit 14 determines the maximum value of the current values repeatedly measured. In S13, the motor control unit 14 waits until the current value (absolute value) of the coil current becomes equal to or less than a threshold. When the current value of the coil current becomes equal to or less than the threshold, in S14, the motor control unit 14 determines whether or not measurement for all of the six excitation phases has been performed. If not, the processing is repeated from S10. On the other hand, in a case where the measurement for all six excitation phases has been performed, in S15, the motor control unit 14 determines the stopping position of the rotor 72 on the basis of the maximum value of the coil current measured for each excitation phase.

Note that the processing of FIG. 10 is merely an example, and the processing for detecting the rotor stopping position according to the present embodiment is not limited to following the flowchart illustrated in FIG. 10. For example, determining the maximum value of the excitation phases (S12) can be performed after the measurement of all of the excitation phases has been completed. Also, when the B period for excitation of an excitation phase has been completed, the determination of S14 may be performed, and in a case where "No" is determined in S14, the motor control unit 14 waits until the coil current becomes the threshold (S13) and repeats the processing from S10.

FIG. 11 is a flowchart of the processing for updating the duty cycle coefficient executed by the motor control unit 14. Note that the processing of FIG. 11 relates to updating the duty cycle coefficient for one excitation phase, and the motor control unit 14 repeatedly executes the processing of FIG. 11 for the six excitation phases. In S20, the motor control unit 14 outputs the PWM signal as described using FIGS. 6 and 7A and 7B on the basis of the duty cycle data and the duty cycle coefficient. Note that for the duty cycle coefficient used in S20, the value at this point in time is used. In S21 at the end timing of the B period, the motor control unit 14 stores the final value of the coil current in the memory 57 as a first determined value. In S22, the motor control unit 14 waits until the current value (absolute value) of the coil current becomes equal to or less than a threshold.

When the current value (absolute value) of the coil current becomes equal to or less than a threshold, in S23, the motor control unit 14 outputs the PWM signal as described using FIGS. 6 and 7A and 7B on the basis of the duty cycle data and a first corrected duty cycle coefficient. The first corrected duty cycle coefficient is, from among the current duty cycle coefficients of the A period, the B period, and the C period, the duty cycle coefficient of the B period to be updated corrected to a value less than the current value. For example, the motor control unit 14 corrects the duty cycle coefficient of the B period by multiplying the current duty cycle coefficient of the B period by an adjustment value less than 1, for example, 0.95. In S24 at the end timing of the B period, the motor control unit 14 stores the final value of the coil current in the memory 57 as a second determined value. In S25, the motor control unit 14 waits until the current value (absolute value) of the coil current becomes equal to or less than a threshold.

When the current value (absolute value) of the coil current becomes equal to or less than a threshold, in S26, the motor control unit 14 outputs the PWM signal as described using FIGS. 6 and 7A and 7B on the basis of the duty cycle data and a second corrected duty cycle coefficient. The second corrected duty cycle coefficient is, from among the current duty cycle coefficients of the A period, the B period, and the C period, the duty cycle coefficient of the B period to be updated corrected to a value greater than the current value. For example, the motor control unit 14 corrects the duty cycle coefficient of the B period by multiplying the current duty cycle coefficient of the B period by an adjustment value greater than 1, for example, 1.05. In S27 at the end timing of the B period, the motor control unit 14 stores the final value of the coil current in the memory 57 as a third determined value.

Thereafter, in S28, the motor control unit 14 updates the duty cycle coefficient of the B period on the basis of the first determined value to the third determined value so that the coil current approaches 0 at the end timing of the B period. For example, the motor control unit 14 obtains the value of the duty cycle coefficient of the B period used in S20, S23, and S26 and the relationship between the value of the duty cycle coefficient of the B period and the final value on the basis of the first determined value to the third determined value. The relationship between the duty cycle coefficient of the B period and the final value can be obtained via linear interpolation of the three determined values, for example. Also, the motor control unit 14 obtains a value of a duty cycle coefficient for making the current value of the coil current 0 at the end timing of the B period on the basis of the obtained relationship and stores this in the non-volatile memory 55 as the updated value for the duty cycle coefficient of the B period.

Note that the processing for updating the duty cycle coefficient of FIG. 11 can be executed as processing independent of the processing for detecting the rotor stopping position of FIG. 10, but the first determined value of S21 of FIG. 11 can be obtained via the processing for detecting the rotor stopping position of FIG. 10. In other words, the current value of the coil current measured at the end timing of the B period in S11 of FIG. 10 can be used as the first determined value. In this case, only the processing from S23 is executed for the processing for updating the duty cycle coefficient of FIG. 11, and the first determined value uses the latest value determined in the processing for detecting the rotor stopping position.

In this manner, according to the present embodiment, a portion of the regenerative current flows to the non-excitation coil. According to this configuration, even when the inverter 60 is controlled so that the attenuation time of the coil current is hastened, an increase in the power supply voltage can be suppressed. Thus, by performing control so that the attenuation time of the coil current is hastened and the amount of time required for the measuring processing of each excitation phase is reduced, the amount of time required for rotor stopping position detection can be reduced.

Second Embodiment

Next, a second embodiment will be described, focusing on the points that differ from the first embodiment. In the present embodiment, the change over time of the duty cycle of the PWM signal is different from that of the first embodiment. FIG. 12 illustrates the change over time according to the present embodiment of the duty cycle of the PWM signal output from the PWM port 58 in the U-V phase measuring processing. Note that the A period as in the first embodiment.

In the present embodiment, the B period is 0.5 ms, and the duty cycle of the PWM signal output from the V-H terminal changes in an M-like shape as illustrated in FIG. 12. In other words, when the B period starts, the first setting period from when the V-phase coil 74 is set from the first state to the second state is set to the maximum value. Thereafter, the first setting period decreases with the passage of time. Then, from a timing until the B period ends, the first setting period increases with the passage of time. Note that the timing of when the first setting period changes from decreasing to increasing can be, for example, the timing at which half of the B period has elapsed from the start of the B period. By performing control in this manner, the regenerative current flowing out from the second terminal of the V-phase coil 74 via the V-phase high-side switching element increases after the start of the B period. This can cause the voltage of the bulk electrolytic capacitor 65 to quickly increase. Thereafter, since the first setting period decreases as the voltage of the bulk electrolytic capacitor 65 increases, the regenerative current to the DC power supply is not increased. Also, the duty cycle increases as the coil current decreases. With this configuration, the change over time of the regenerative current flowing into the DC power supply in the B period can be reduced, allowing for an increase in the voltage of the DC power supply to be suppressed.

Note that in the C period, the change over time of the duty cycle of the PWM signal output from the W-H terminal is set so that the coil current flowing in the W-phase coil 75 attenuates to 0 within the B period. In the present example, as illustrated in FIG. 12, the C period is a period of 0.1 ms that starts at the same time as the B period, and the duty cycle of the PWM signal output from the W-H terminal changes in a rectangular wave-like shape. In other words, in the C period, the second setting period from when the W-phase coil 75 is set to the first state to when the W-phase coil 75 is set to the third state is constant. #1, #2, and #3 of FIG. 13 indicate the duty cycle data of the A period, the B period, and the C period, respectively.

With this configuration, the change over time of the regenerative current in the B period can be reduced, allowing for an increase in the voltage of the DC power supply to be suppressed. Thus, by performing control so that the attenuation time of the coil current is hastened and the amount of time required for the measuring processing of each excitation phase is reduced, the amount of time required for rotor stopping position detection can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-132044, filed Aug. 14, 2023, which is hereby incorporated by reference herein in its entirety.

What is claimed is:

1. An image forming apparatus that forms an image on a sheet conveyed along a conveying path, the image forming apparatus comprising:
    a rotating member;
    a motor configured to drive the rotating member, the motor including at least three coils with first terminals of the at least three coils being connected to one another; and
    a motor control unit configured to control the motor by controlling a potential of second terminals different from the first terminals of the at least three coils, the motor control unit detecting a stopping position of a rotor of the motor by executing measuring processing on each of a plurality of excitation phases indicated by a permutation of two coils from among the at least three coils, the measuring processing including performing control so that a coil current flows from a first coil to a second coil from among the at least three coils and measuring a current value of the coil current,
    wherein the motor control unit is configured to:

perform control so that the coil current flows from the first coil toward the second coil in a first period of the measuring processing,
perform control so that the coil current flowing from the first coil toward the second coil in the first period attenuates in a second period following the first period, and
perform control so that a portion of the coil current flowing from the first coil toward the second coil flows, from the second terminal of the second coil, to a third coil, which is different from the first coil and the second coil, from among the at least three coils, from the second terminal of the third coil, for a third period, which is part of the second period.

2. The image forming apparatus according to claim 1, wherein;
    the motor control unit is configured to control the motor by setting each of the at least three coils to any one of:
        a first state in which the second terminal of a coil is connected to a third terminal of a first potential,
        a second state in which the second terminal of a coil is connected to a fourth terminal of a second potential lower than the first potential, or
        a third state in which the second terminal of a coil is not connected to the third terminal and the fourth terminal, and
    the motor control unit is configured to:
        set the first coil to the second state in the second period,
        set the second coil alternately to the first state and the second state in the second period,
        set the third coil to the third state in a fourth period, which is part the second period, different from the third period, and
        set the third coil alternately to the first state and the third state in the third period.

3. The image forming apparatus according to claim 2, wherein the motor control unit is configured to perform control so that a first setting period from when the second coil is set to the first state to when the second coil is set to the second state increases as time passes and thereafter the first setting period decreases as time passes in the second period.

4. The image forming apparatus according to claim 2, wherein the motor control unit is configured to perform control so that a second setting period from when the third coil is set to the first state to when the third coil is set to the third state increases as time passes and thereafter the second setting period decreases as time passes in the third period.

5. The image forming apparatus according to claim 2, wherein the motor control unit is configured to perform control so that a first setting period from when the second coil is set to the first state to when the second coil is set to the second state decreases as time passes and thereafter the first setting period increases as time passes in the second period.

6. The image forming apparatus according to claim 2, wherein the motor control unit is configured to perform control so that a second setting period from when the third coil is set to the first state to when the third coil is set to the third state is constant in the third period.

7. The image forming apparatus according to claim 3, wherein:
    the motor control unit includes data indicating a relationship between elapsed time and a setting period, and
    the motor control unit is configured to:

determine a relationship between the elapsed time and the first setting period in the second period by multiplying the setting period indicated by the data by a coefficient, determine a current value of the coil current flowing from the first coil to the second coil at end timing of the second period, and update the coefficient so that the current value of the coil current flowing from the first coil to the second coil approaches 0 at the end timing of the second period.

8. The image forming apparatus according to claim 7, wherein:

in a case where the current value of the coil current flowing from the first coil to the second coil is a positive value at the end timing of the second period, the motor control unit is configured to update the coefficient to increase the coefficient, and in a case where the current value of the coil current flowing from the first coil to the second coil is a negative value at the end timing of the second period, the motor control unit is configured to update the coefficient to decrease the coefficient.

9. The image forming apparatus according to claim 2, wherein, in the first period, the motor control unit is configured to:

set the second coil to the second state, set the third coil to the third state, and set the first coil alternately to the first state and the second state.

10. The image forming apparatus according to claim 9, wherein the motor control unit is configured to perform control so that a third setting period from when the first coil is set to the first state to when the first coil is set to the second state increases as time passes and thereafter the third setting period decreases as time passes in the first period.

11. The image forming apparatus according to claim 1, wherein the motor control unit is configured to, in the measuring processing, determine a maximum value of the coil current flowing from the first coil toward the second coil, and detect the stopping position of the rotor on a basis of the maximum value determined by the measuring processing executed for each of the plurality of excitation phases.

12. The image forming apparatus according to claim 11, wherein the motor control unit is configured to detect the stopping position of the rotor on a basis of a largest value from among the maximum values determined in the measuring processing executed for each of the plurality of excitation phases.

* * * * *